(12) United States Patent
Li et al.

(10) Patent No.: US 9,875,516 B2
(45) Date of Patent: Jan. 23, 2018

(54) SYSTEMS AND METHODS FOR GRAPHICS PROCESS UNITS POWER MANAGEMENT

(71) Applicant: Marvell World Trade Ltd., St. Michael (BB)

(72) Inventors: Juntao Li, Shanghai (CN); Steven Gao, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 123 days.

(21) Appl. No.: 14/513,289

(22) Filed: Oct. 14, 2014

(65) Prior Publication Data

US 2015/0103085 A1    Apr. 16, 2015

Related U.S. Application Data

(60) Provisional application No. 61/890,583, filed on Oct. 14, 2013.

(51) Int. Cl.
| | |
|---|---|
| *G06T 1/20* | (2006.01) |
| *G09G 5/36* | (2006.01) |
| *G09G 5/18* | (2006.01) |

(52) U.S. Cl.
CPC .............. *G06T 1/20* (2013.01); *G09G 5/363* (2013.01); *G09G 5/18* (2013.01); *G09G 2330/021* (2013.01)

(58) Field of Classification Search
CPC .................. G09G 2330/02; G09G 5/18; G09G 2330/021; G09F 13/04; G06F 15/17331; G06F 1/324; G06F 9/485; G06T 1/20; G06T 15/005; Y02B 60/1217; H04L 12/281; H04L 12/2818

USPC ......................................................... 345/522
See application file for complete search history.

(56) References Cited

U.S. PATENT DOCUMENTS

| | | |
|---|---|---|
| 6,397,343 B1 | 5/2002 | Williams et al. |
| 9,196,013 B2 * | 11/2015 | Hendry ..................... G06T 1/20 |
| 2007/0091101 A1 * | 4/2007 | Huang .................. G06F 9/3879 |
| | | 345/506 |
| 2008/0079732 A1 | 4/2008 | Park et al. |

(Continued)

FOREIGN PATENT DOCUMENTS

| | | |
|---|---|---|
| CN | 103019367 | 4/2013 |
| WO | 2013119226 | 8/2013 |

OTHER PUBLICATIONS

International Search Report & Written Opinion dated Jun. 22, 2015 in related/corresponding International PCT Patent Appl. No. PCT/IB14/02822, filed Oct. 14, 2014.

(Continued)

*Primary Examiner* — Gregory J Tryder
*Assistant Examiner* — Kwang Lee (57) ABSTRACT

Systems and methods are provided for frequency adjustment of graphics process units (GPUs). A system includes: a command parser configured to parse one or more first commands associated with one or more future GPU operations to obtain command information, a processing component configured to determine an operation time for the future GPU operations based at least in part on the command information, and a frequency control component configured to adjust a GPU frequency based at least in part on the operation time for the future GPU operations.

17 Claims, 6 Drawing Sheets

(56) References Cited

U.S. PATENT DOCUMENTS

| | | | | |
|---|---|---|---|---|
| 2010/0123717 A1* | 5/2010 | Jiao | ............... | G06T 15/005 345/426 |
| 2012/0081373 A1* | 4/2012 | Li | ............... | G06F 9/4893 345/520 |
| 2013/0265309 A1* | 10/2013 | Goel | ............... | G06T 15/80 345/426 |
| 2015/0015589 A1* | 1/2015 | Chung | ............... | G06F 1/324 345/501 |
| 2015/0049110 A1* | 2/2015 | Lum | ............... | G06T 1/60 345/600 |

OTHER PUBLICATIONS

Yan "Power Management for Interactive 3D Games" In: A Thesis Submitted for the Requirement of Doctor of Philosophy Department of Computer Science, School of Computing, National University of Singapore, 2008 [online][retrieved on May 16, 2015 (May 15, 2015)] Retrieved from the Internet <URL: http://www.google.com/url?a=t&rct=j&q=&esrc=s&source=web&cd=3&cad=rja&uact=8&ved=OCDEQFjAC&url=http%3A%2F%2Fscholarbank.us.sg%2Fbitstream%2Fhandle%2F10635%2F16102%2FGuYan.pdf%3Fsequence%.

International Preliminary Report on Patentability and Written Opinion dated Apr. 28, 2016 in related/corresponding PCT Patent Appl. No. PCT/IB2014/002822, filed Oct. 14, 2014.

International Search Report and Written Opinion dated Apr. 18, 2017 from related/corresponding European Patent Appl. No. EP14853645.1, filed Mar. 21, 2016.

Yan Gu et al: "Power Management of Interactive 3D Games Using Frame Structures", VLSI Design, 2008 VLSID 2208. 21st International Conference on, IEEE, Piscataway, NJ, USA, Jan. 4, 2008 (Jan. 4, 2008), pp. 679-684, XP031230115. ISBN: 978-0-7695-3083-3.

\* cited by examiner

SYSTEMS AND METHODS FOR GRAPHICS PROCESS UNITS POWER MANAGEMENT

CROSS-REFERENCE TO RELATED APPLICATIONS

This disclosure claims priority to and benefit from U.S. Provisional Patent Application No. 61/890,583, filed on Oct. 14, 2013, the entirety of which is incorporated herein by reference.

FIELD

The technology described in this patent document relates generally to graphics processing and more particularly to power management of graphics process units.

BACKGROUND

A graphics process unit (GPU) often includes a parallel structure that efficiently manipulates graphical objects by rapidly performing a series of primitive operations and displaying the resulting images on graphical displays. GPUs have been used in many electronic devices, such as mobile phones, personal computers, workstations, and game consoles.

SUMMARY

In accordance with the teachings described herein, systems and methods are provided for frequency adjustment of graphics process units (GPUs). A system includes: a command parser configured to parse one or more commands associated with one or more future GPU operations to obtain command information, a processing component configured to determine an operation time for the future GPU operations based at least in part on the command information, and a frequency control component configured to adjust a GPU frequency based at least in part on the operation time for the future GPU operations.

In one embodiment, method is provided for frequency adjustment of a graphics process unit (GPU). One or more commands associated with future GPU operations are parsed to obtain command information. An operation time is determined for the future GPU operations based at least in part on the command information. A GPU frequency is adjusted based at least in part on the operation time for the future GPU operations.

In another embodiment, a computer-implemented system is provided for frequency adjustment of a graphics process unit (GPU). The system includes one or more data processors and a computer-readable storage medium. The storage medium is encoded with instructions for commanding the one or more data processors to execute certain operations. One or more commands associated with future GPU operations are parsed to obtain command information. An operation time is determined for the future GPU operations based at least in part on the command information. A GPU frequency is adjusted based at least in part on the operation time for the future GPU operations.

DETAILED DESCRIPTION

Many different approaches may be adopted to improve performance of graphics process units (GPUs), such as adding more shade/s, more cores, and more processing units, performing more texture compression, and increasing the operating frequency of GPUs. Along with such performance improvements, however, power consumption of the GPUs is often increased significantly. To enable efficient graphics processing white reducing power consumption, the workload of a GPU may be monitored during a sampling window (e.g., 100 ms), and the operating frequency of the GPU is adjusted according to the sampled workload. For example, if the sampled workload is high, the operating frequency of the GPU may be increased. Conversely, if the sampled workload is low, the operating frequency of the GPU may be decreased. Such sampling-based power management causes the operating frequency of the GPU to be adjusted based on the GPU's post workload, which may result in delayed responses Co workload changes, e.g., during the processing of fluctuating workloads.

Figure 1:
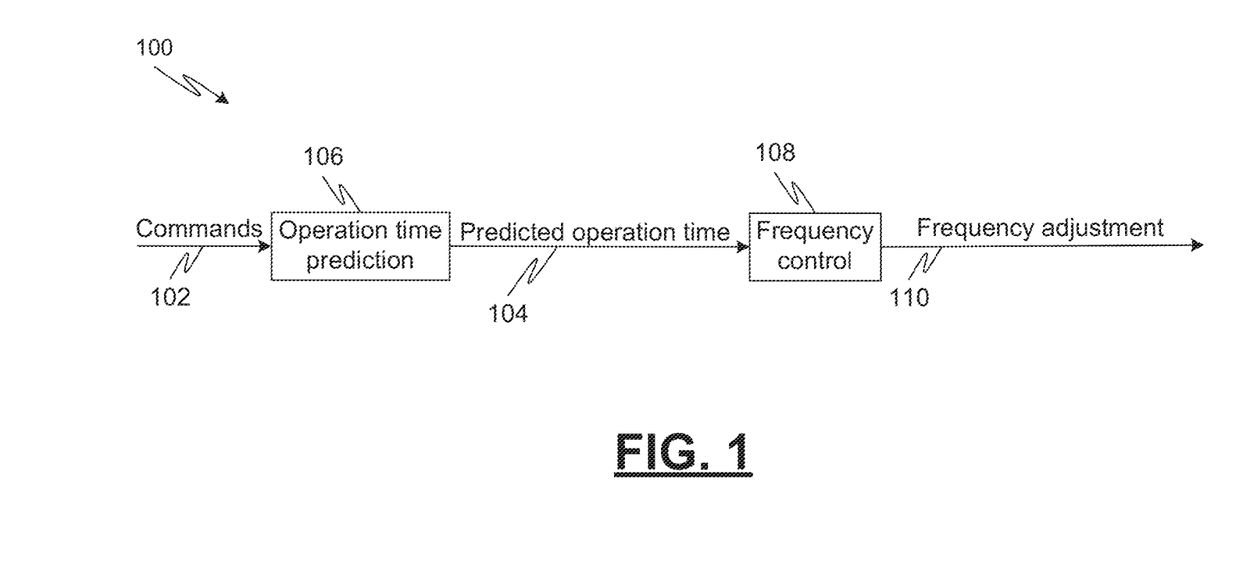
FIG. 1-FIG. 4 depict example diagrams showing a system for GPU frequency adjustment.

FIG. 1 depicts an example diagram showing a system for GPU frequency adjustment. As shown in FIG. 1, one or more commands 102 associated with future GPU operations are analyzed for predicting an operation time 104 for the future GPU operations, and GPU operating frequency is adjusted according to the predicted operation time 104. Specifically, an operation time prediction component 106 determines the operation time 104 (e.g., during a prediction period) based at least in part on the commands 102. A frequency control component 108 determines frequency adjustment 110 according to the predicted operation time 104, so that the GPU operating frequency is adjusted for predicted future workload indicated by the operation time 104.

Figure 2:
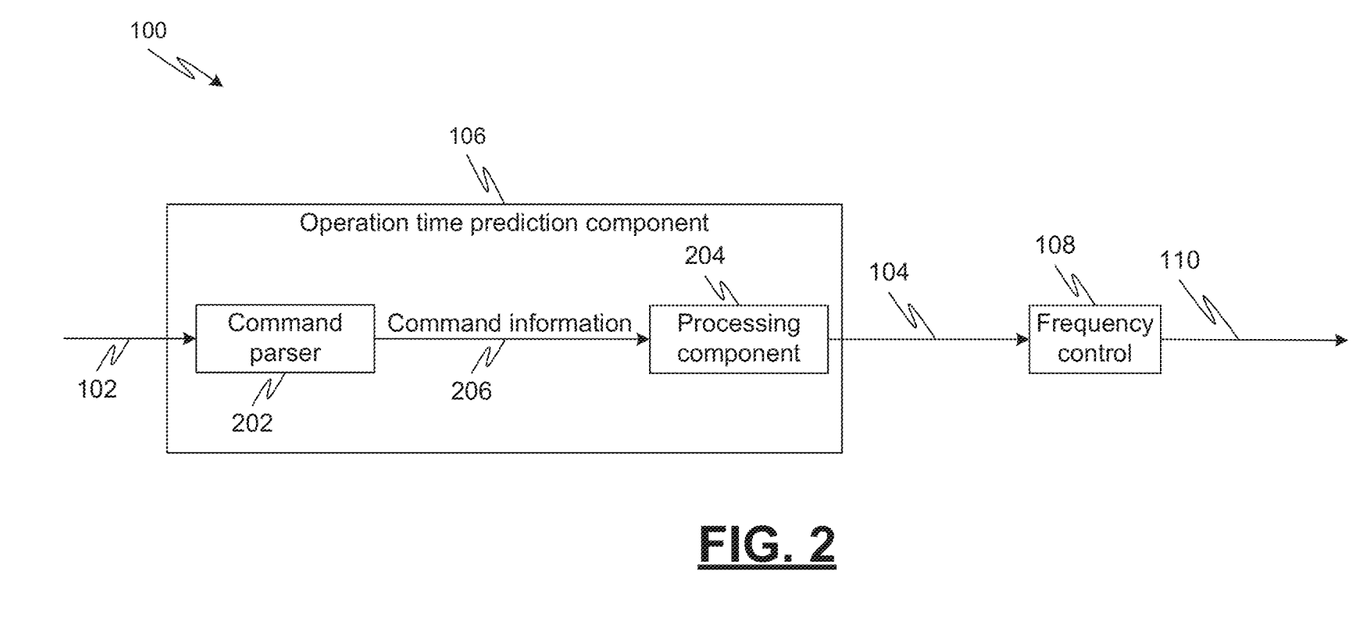
Figure 3:
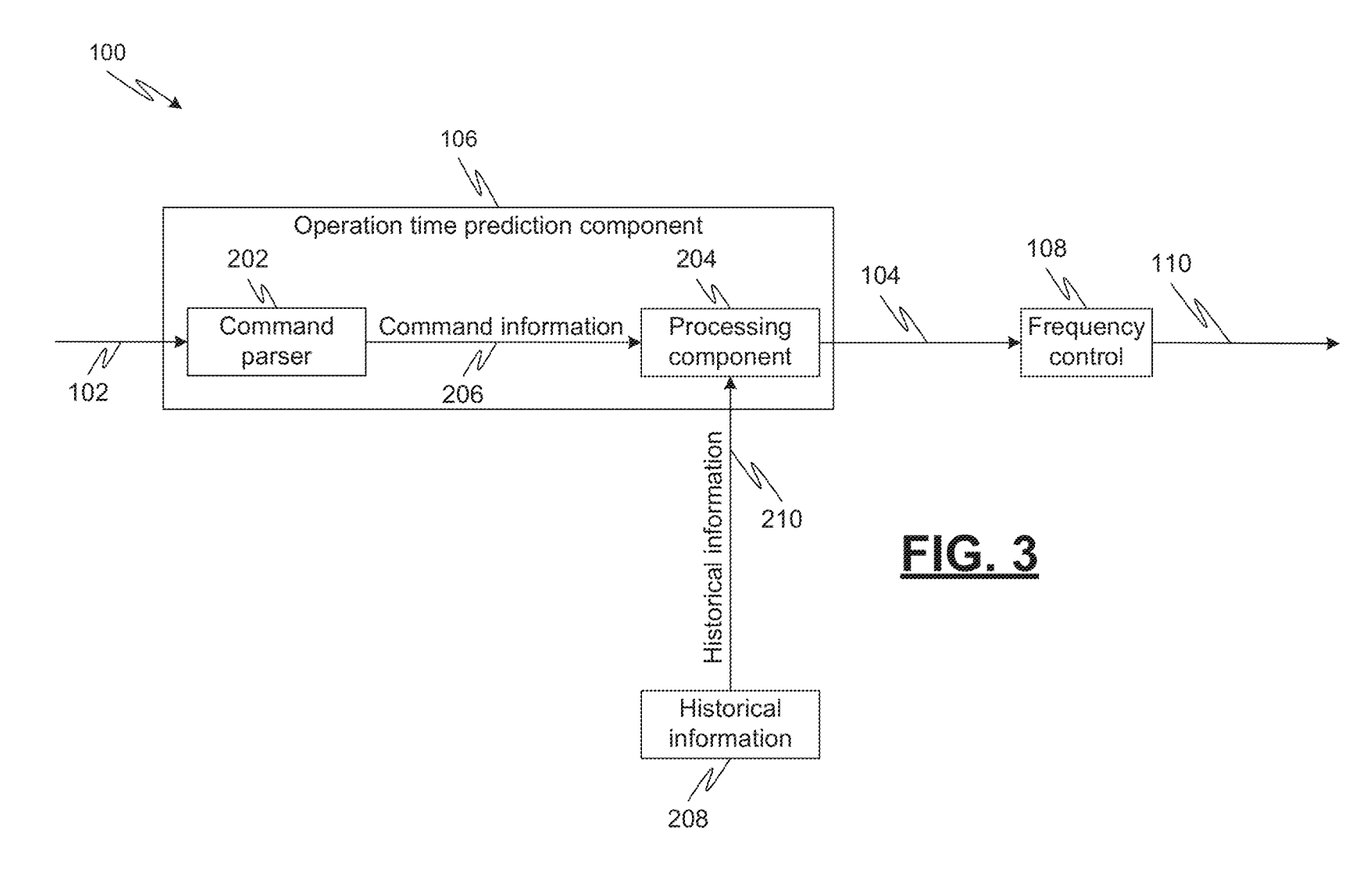

The operation time prediction component 106 includes a command parser 202 and a processing component 204, as shown in FIG. 2. Particularly, the command parser 202 analyzes the commands 102 to obtain command information 206, and the processing component 204 determines the operation time 104 based at least in part on the command information 206. The prediction of the operation time 104 may also take into account historical information according to previous GPU operations. As shown in FIG. 3, a historical information component 208 generates historical information 210, and the processing component 204 determines the predicted operation time 104 using both the command information 206 and the historical information 210. The processing component 204 may determine the operation time 104 by estimating GPU bandwidths and GPU cycles.

In some embodiments, the commands 102 include one or more three-dimensional commands related to three-dimensional GPU operations. For three-dimensional commands, the command information 206 includes: a clear range (C.w, C.h), a vertex count (VC), a vertex shader instruction (VSI), a pixel shader instruction (PSI), an average number of bytes per pixel of textures (tbpp), etc. The historical information 210 includes: a vertex cutting rate (VCR), a triangle culling rate (TCR), pixels per triangle (PPT), texture pixels of sampling (TPS), a depth test pass rate (DTPR), etc.

The processing component 204 determines the operation time 104 using both the command information 206 and the historical information 210:

$$T_{busy} = \max\left(\frac{TSI}{f_{shader} \times SC}, \frac{TMB}{TB}\right) \qquad (1)$$

where $T_{busy}$ represents the operation time 104, TSI represents total GPU shader instructions, $f_{shader}$ represents a shader frequency, SC represents a shader count, TMB represents a total GPU memory bandwidth, and TB represents a GPU total bandwidth associated with the three-dimensional commands.

Specifically, the processing component 204 determines a triangle count (TC) as follows:

$$TC = \frac{(VC - VCR)}{a} \times (1 - TCR) \qquad (2)$$

where VC represents a vertex count, VCR represents a vertex cutting rate, TCR represents a triangle culling rate, and a represents a first constant parameter. For example, a is equal to 3 for triangles, and a is equal to 1 for triangle strips and triangle fans.

Also, the processing component 204 determines a pixel count (PC) as follows:

PC=TC×PPT (3)

where PPT represents pixels per triangle. The processing component 204 determines the total GPU shader instructions (TSI) as follows:

TSI=sum(VC×VSI)+sum(PC×DTPR×PSI) (4)

where VSI represents a vertex shader instruction, DTPR represents a depth test pass rate, PSI represents a pixel shader instruction, and sum represents a summation operation.

Furthermore, the processing component 204 determines the total GPU memory bandwidth (TMB) as follows:

TMB=((C.w×C.h)×b+PC×DTPR)×bpp+PC×TPS×tbpp (5)

where (C.w, C.h) represents a clear range, bpp represents a number of bytes per pixel, tbpp represents an average number of bytes per pixel of textures, TPS represents texture pixels of sampling, and b represents a second constant parameter.

In certain embodiments, the commands 102 includes one or more two-dimensional commands (e.g., copy, zoom, rotate, zoom and rotate, filter, etc.) related to two-dimensional GPU operations. For two-dimensional commands, the command information 206 includes: a source width, a source height, a source format, a number bytes per pixel of a source image (SBPP), a destination width, a destination height, a destination format, a number of bytes per pixel of a destination image (DBPP), a pixel count of the source image (PSB), a pixel count of the destination image (PDB), a fitter quality, a rotation angle, a zooming parameter, etc. The processing component 204 determines the operation time 104 as follows:

$$T_{busy} = \max\left(\frac{CC}{f_{2D}}, \frac{TTB}{TB}\right) \qquad (6)$$

where $T_{busy}$ represents the operation time 104, CC represents a number of clock cycles associated with the two-dimensional commands, $f_{2D}$ represents a frequency associated with the two-dimensional commands, TTB represents a total bandwidth associated with the two-dimensional commands, and TB represents a GPU total bandwidth associated with the two-dimensional commands.

Specifically, the processing component 204 determines the total bandwidth associated with the two-dimensional commands (TTB) as follows:

TTB=OB×(1+CP) (7)

where OB represents an original bandwidth and CP represents a cache penalty. Table 1 shows an example of cache penalty associated with two-dimensional commands.

TABLE 1

| Cache Penalty | Planar YUV | RGBA |
| --- | --- | --- |
| Zoom | 4 | 1 |
| Rotate | 25% | 20% |
| Zoom + Rotate | 50% | 40% |

Further, the processing component 204 determines the number of clock cycles associated with the two-dimensional commands (CC) as follows:

$$CC = \frac{PDB}{PPC} \qquad (8)$$

where PDB represents a pixel count of a destination image, and PPC represents a number of pixels per clock cycle. Table 2 shows an example of PPC associated with two-dimensional commands.

TABLE 2

| | Blit | Stretch Blit | Filter Blit-no zooming | Filter Blit-Zooming |
| --- | --- | --- | --- | --- |
| PPC | 4 | 1 | 1 | 0.5 |

For example, when the commands 102 includes a stretch blit command, the processing component 204 determines OB as follows:

OB=2×PDB×DBPP (9)

where DBPP represents a number of bytes per pixel of the destination image. When the commands 102 include a filter blit command, the processing component 204 determines OB as follows:

OB=PSB×SBPP+PDB×DBPP (10)

where SBPP represents a number bytes per pixel of a source image, PSB represents a pixel count of the source image, and DBPP represents a number of bytes per pixel of the destination image. When the commands 102 include a high quality filter blit command, the processing component 204 determines GB as follows:

OB=2×(PSB×SBPP+PDB×DBPP) (11)

where SBPP represents a number bytes per pixel of a source image, PSB represents a pixel count of the source image, and DBPP represents a number of bytes per pixel of the destination image.

Figure 4:
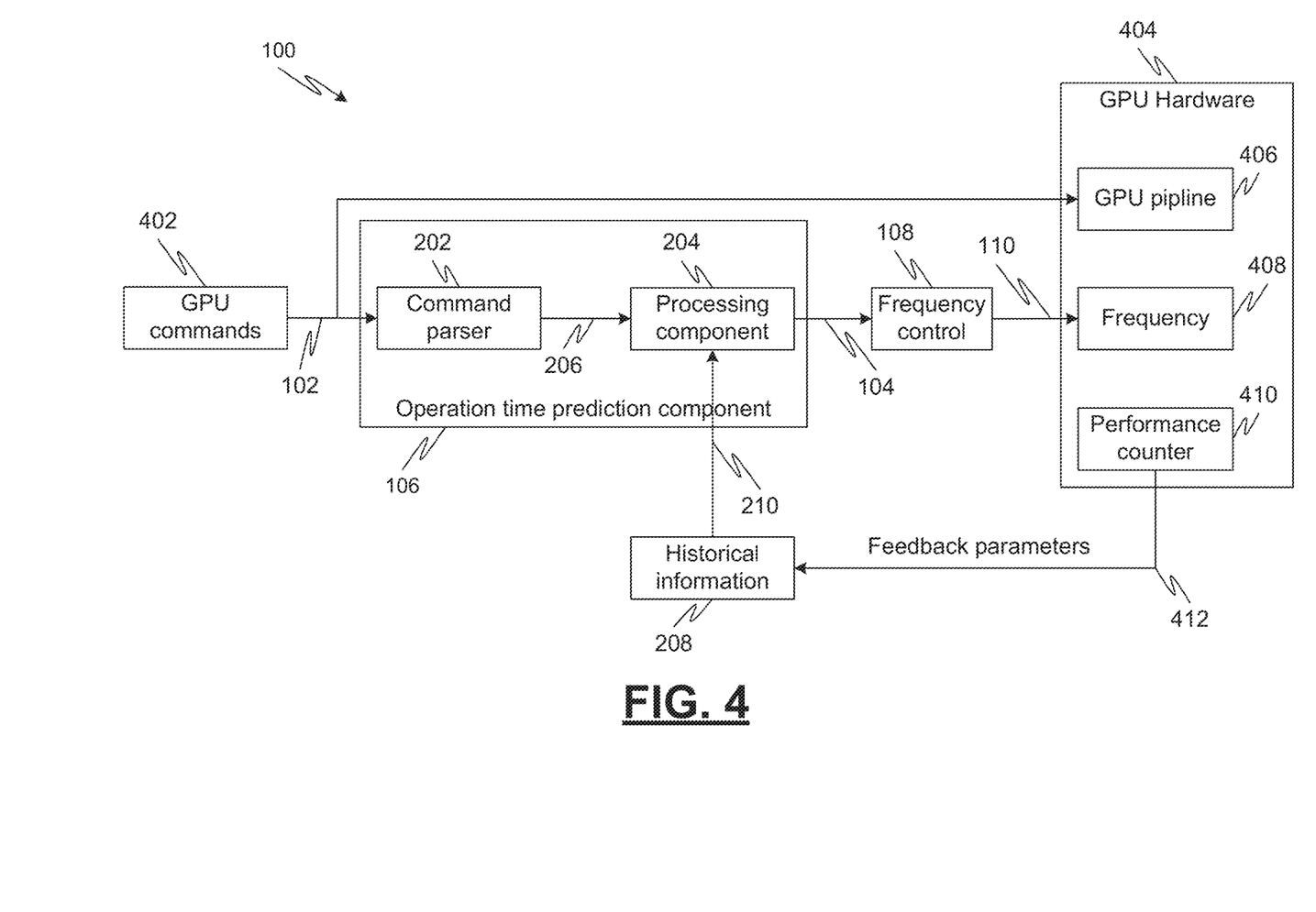

FIG. 4 depicts another example diagram showing a system for GPU frequency adjustment. As shown in FIG. 4, the system 100 further includes a GPU commands component 402 and certain GPU hardware components 404. The GPU commands component 402 provides the commands 102 to the command parser 202 for extraction of the command information 206. In addition, the GPU commands component 402 provides the commands 102 to a GPU pipeline 406 for command execution. The frequency control component 108 outputs the frequency adjustment 110 to a frequency module 408 to adjust the GPU operating frequency. In addition, a performance counter component 410 generates feedback parameters 412 based on the Gni performance to the historical information 208. For example, the feedback parameters 412 include GPU performance parameters and/or key performance parameters.

Figure 5:
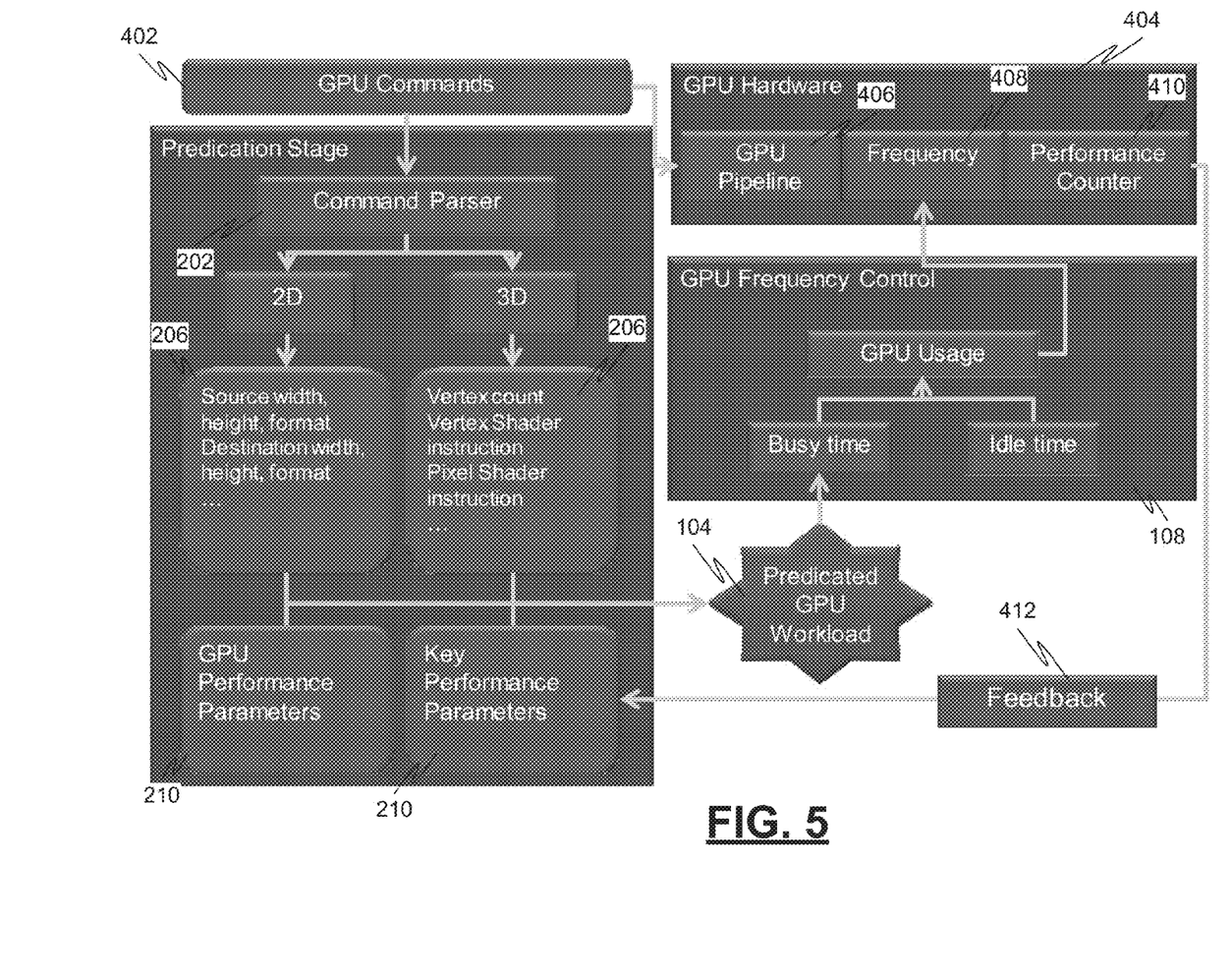
FIG. 5 depicts an example block diagram showing a system tier GPU frequency adjustment.

FIG. 5 depicts an example block diagram showing a system for GPU frequency adjustment. As shown in FIG. 5, the command parser 202 extracts the command information 206 associated with two-dimensional commands and/or three-dimensional commands. The command information 206 together with the historical information 210 is used to predict future GPU workload (e.g., the operation time 104). For example, the frequency control component 108 determines how busy the GPU is during a next sampling window based on the operation time 104. If the percentage of the predicted operation time 104 over the duration of the next sampling window is higher than a threshold, then the GPU operating frequency is increased (e.g., immediately). On the other hand, if the percentage of the predicted operation time 104 over the duration of the next sampling window is lower than the threshold, the GPI operating frequency is decreased (e.g., immediately). In some embodiments, software Quality of Service (QoS) that relates to an overall GPU performance may be achieved based on prediction. If GPU operations need to be completed within a certain period of time, then the GPU operating frequency can be adjusted accordingly.

Figure 6:
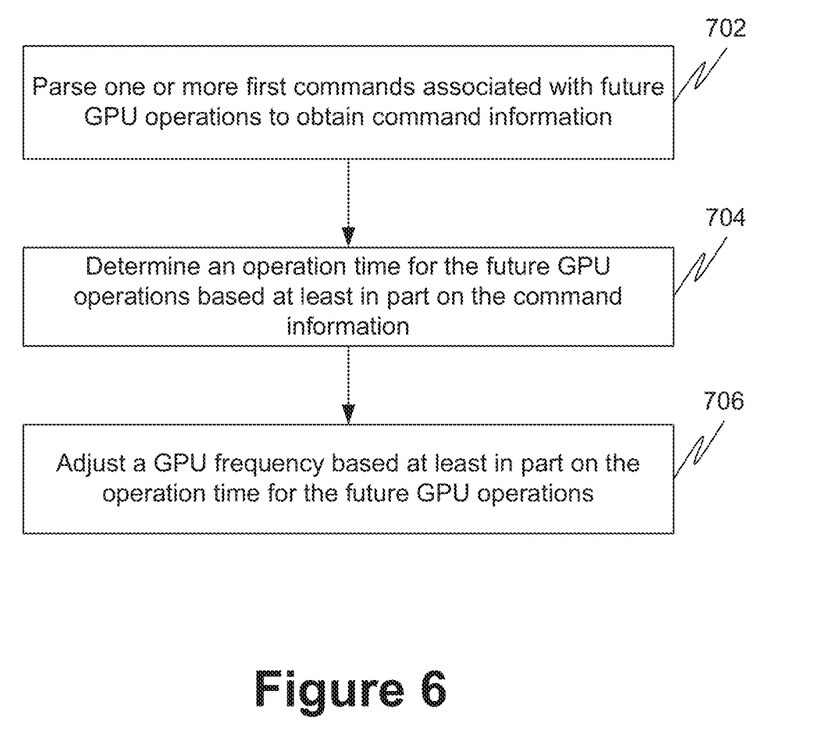
FIG. 6 depicts an example flow chart for GPU frequency adjustment.

FIG. 6 depicts an example flow chart for GPU frequency adjustment. As shown in FIG. 6, GPU frequency adjustment is performed based at least in part on prediction of GPU operation time. Specifically, at 702, one or more first commands associated with future GPU operations are parsed to obtain command information. At 704, an operation time for the future GPU operations is determined based at least in part on the command information. At 706, a GPU frequency is adjusted based at least in part on the operation time for the future GPU operations.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A hardware frequency adjustment system of a graphics process unit (GPU), the system comprising:
one or more processors configured to
parse one or more first commands that include one or more three-dimensional commands and that are to be executed and are associated with one or more future GPU operations, to obtain command information;
determine an operation time ($T_{busy}$) for the future GPU operations based at least in part on the command information, as follows $$T_{busy} = \max\left(\frac{TSI}{f_{shader} \times SC}, \frac{TMB}{TB}\right)$$

where TSI represents total GPU shader instructions, $f_{shader}$ represents shader frequency, SC represents a shader count, TMB represents total GPU memory bandwidth, and TB represents GPU total bandwidth associated with the three-dimensional commands; and
adjust a GPU frequency based at least in part on the operation time for the future GPU operations, such that the GPU frequency is adjusted at least partially based on the command information obtained from parsing the one or more first commands that are to be executed.

2. The system of claim 1, further comprising:
a historical information component configured to generate historical information associated with one or more previous GPU operations;
wherein the one or more processors are further configured to determine the operation time using the command information and the historical information.

3. The system of claim 2, further comprising:
a performance counter component configured to determine one or more feedback parameters associated with the previous GPU operations and provide the feedback parameters to the historical information component.

4. The system of claim 2, wherein:
the command information includes one or more of the following: a clear range (C.w, C.h), a vertex count (VC), a vertex shader instruction (VSI), a pixel shader instruction (PSI), and an average number of bytes per pixel of textures (tbpp); and
the historical information includes one or more of the following: a vertex cutting rate (VCR), a triangle culling rate (TCR), pixels per triangle (PPT), texture pixels of sampling (TPS), and a depth test pass rate (DTPR).

5. The system of claim 1, wherein:
the one or more processors are further configured to determine a triangle count (TC) as follows:

$$TC = \frac{(VC - VCR)}{a} \times (1 - TCR)$$

where VC represents a vertex count, VCR represents a vertex cutting rate, TCR represents a triangle culling rate, and a represents a first constant parameter;
the one or more processors are further configured to determine a pixel count (PC) as follows:

PC=TC×PPT where PPT represents pixels per triangle;
the one or more processors are further configured to determine the total GPU shader instructions (TSI) as follows:

TSI=sum(VC×VSI)+sum(PC×DTPR×PSI)

where VSI represents a vertex shader instruction, DTPR represents a depth test pass rate, PSI represents a pixel shader instruction, and sum represents a summation operation; and the one or more processors are is further configured to determine the total GPU memory bandwidth (TMB) as follows:

$$TMB = ((C.w \times C.h) \times b + PC \times DTPR) \times bpp + PC \times TPS \times tbpp$$

where (C.w, C.h) represents a clear range, bpp represents a number of bytes per pixel, tbpp represents an average number of bytes per pixel of textures, TPS represents texture pixels of sampling, and b represents a second constant parameter.

6. The system of claim 1, wherein the one or more processors are further configured to:
   determine a predicted GPU usage based at least in part on the operation time;
   in response to the predicted GPU usage being above a threshold, increase the GPU frequency; and
   in response to the predicted GPU usage being below the threshold, decrease the GPU frequency.

7. A method for frequency adjustment of a graphics process unit (GPU), the method comprising:
   parsing one or more first commands that include one or more three-dimensional commands and that are to be executed and are associated with future GPU operations, to obtain command information;
   determining an operation time ($T_{busy}$) for the future GPU operations based at least in part on the command information, as follows $$T_{busy} = \max\left(\frac{TSI}{f_{shader} \times SC}, \frac{TMB}{TB}\right)$$

where TSI represents total GPU shader instructions, $f_{shader}$ represents a shader frequency, SC represents a shader count, TMB represents a total GPU memory bandwidth, and TB represents a GPU total bandwidth associated with the three-dimensional commands; and
   adjusting a GPU frequency based at least in part on the operation time for the future GPU operations, such that the GPU frequency is adjusted at least partially based on the command information obtained from parsing the one or more first commands that are to be executed.

8. The method of claim 7, further comprising:
generating historical information associated with one or more previous GPU operations;
wherein the operation time is determined using the command information and the historical information.

9. The method of claim 8, wherein:
the command information includes one or more of the following: a clear range (C.w, C.h), a vertex count (VC), a vertex shader instruction (VSI), a pixel shader instruction (PSI), and an average number of bytes per pixel of textures (tbpp); and
the historical information includes one or more of the following: a vertex cutting rate (VCR), a triangle culling rate (TCR), pixels per triangle (PPT), texture pixels of sampling (TPS), and a depth test pass rate (DTPR).

10. A hardware frequency adjustment system of a graphics process unit (GPU), the system comprising:
one or more processors configured to
parse one or more first commands that include one or more two-dimensional commands and that are to be executed and are associated with one or more future GPU operations, to obtain command information;
determine an operation time ($T_{busy}$) for the future GPU operations based at least in part on the command information, as follows $$T_{busy} = \max\left(\frac{CC}{f_{2D}}, \frac{TTB}{TB}\right)$$

where CC represents a number of clock cycles associated with the two-dimensional commands, $f_{2D}$ represents a frequency associated with the two-dimensional commands, TTB represents a total bandwidth associated with the two-dimensional commands, and TB represents a GPU total bandwidth associated with the two-dimensional commands; and
adjust a GPU frequency based at least in part on the operation time for the future GPU operations, such that the GPU frequency is adjusted at least partially based on the command information obtained from parsing the one or more first commands that are to be executed.

11. The system of claim 10, wherein:
the command information includes one or more of the following: a source width, a source height, a source format, a number bytes per pixel of a source image (SBPP), a destination width, a destination height, a destination format, a number of bytes per pixel of a destination image (DBPP), a pixel count of the source image (PSB), a pixel count of the destination image (PDB), a filter quality, a rotation angle, and a zooming parameter.

12. The system of claim 10, wherein:
the one or more processors are further configured to determine the total bandwidth associated with the two-dimensional commands (TTB) as follows:

$$TTB = OB \times (1 + CP)$$

where OB represents an original bandwidth, and CP represents a cache penalty; and
the one or more processors are further configured to determine the number of clock cycles associated with the two-dimensional commands (CC) as follows:

$$CC = \frac{PDB}{PPC}$$

where PDB represents a pixel count of a destination image, and PPC represents a number of pixels per clock cycle.

13. The system of claim 12, wherein:
the first commands include a stretch blit command; and
the one or more processors are further configured to determine the original bandwidth (OB) as follows:

$$OB = 2 \times PDB \times DBPP$$

where DBPP represents a number of bytes per pixel of the destination image.

14. The system of claim 12, wherein:
the first commands include a filter blit command; and
the one or more processors are further configured to determine the original bandwidth (OB) as follows:

$$OB = PSB \times SBPP + PDB \times DBPP$$

where SBPP represents a number bytes per pixel of a source image, PSB represents a pixel count of the source image, and DBPP represents a number of bytes per pixel of the destination image.

15. The system of claim 12, wherein:

the first commands include a high quality filter blit command; and the one or more processors are further configured to determine the original bandwidth (OB) as follows:

OB=2×(PSB×SBPP+PDB×DBPP)

where SBPP represents a number bytes per pixel of a source image, PSB represents a pixel count of the source image, and DBPP represents a number of bytes per pixel of the destination image.

16. A method for frequency adjustment of a graphics process unit (GPU), the method comprising:

parsing one or more first commands that include one or more two-dimensional commands and that are to be executed and are associated with future GPU operations, to obtain command information;

determining an operation time ($T_{busy}$) for the future GPU operations based at least in part on the command information, as follows $$T_{busy} = \max\left(\frac{CC}{f_{2D}}, \frac{TTB}{TB}\right)$$

where CC represents a number of clock cycles associated with the two-dimensional commands, $f_{2D}$ represents a frequency associated with the two-dimensional commands, TTB represents a total bandwidth associated with the two-dimensional commands, and TB represents a GPU total bandwidth associated with the two-dimensional commands; and adjusting a GPU frequency based at least in part on the operation time for the future GPU operations, such that the GPU frequency is adjusted at least partially based on the command information obtained from parsing the one or more first commands that are to be executed.

17. The method of claim 16, wherein:

the command information includes one or more of the following: a source width, a source height, a source format, a number bytes per pixel of a source image (SBPP), a destination width, a destination height, a destination format, a number of bytes per pixel of a destination image (DBPP), a pixel count of the source image (PSB), a pixel count of the destination image (PDB), a filter quality, a rotation angle, and a zooming parameter.

* * * * *